US006894581B2

(12) United States Patent
Noujeim

(10) Patent No.: US 6,894,581 B2
(45) Date of Patent: May 17, 2005

(54) MONOLITHIC NONLINEAR TRANSMISSION LINES AND SAMPLING CIRCUITS WITH REDUCED SHOCK-WAVE-TO-SURFACE-WAVE COUPLING

(75) Inventor: Karam Michael Noujeim, Sunnyvale, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 10/439,563

(22) Filed: May 16, 2003

(65) Prior Publication Data

US 2004/0227581 A1 Nov. 18, 2004

(51) Int. Cl.[7] .............................. H01P 3/08; G02F 1/39

(52) U.S. Cl. ......................... 333/20; 333/247; 333/238; 359/330; 359/326

(58) Field of Search .......................... 333/20, 238, 247; 359/333, 326

(56) References Cited

U.S. PATENT DOCUMENTS

| | | | | |
|---|---|---|---|---|
| 4,956,568 A | | 9/1990 | Su et al. | 307/352 |
| 5,014,018 A | | 5/1991 | Rodwell et al. | 333/20 |
| 5,256,996 A | | 10/1993 | Marsland et al. | 333/20 |
| 5,264,800 A | * | 11/1993 | Black | 333/20 |
| 5,267,020 A | | 11/1993 | Marsland et al. | 257/368 |
| 5,352,627 A | * | 10/1994 | Cooper | 333/20 |
| 5,378,939 A | | 1/1995 | Marsland et al. | 307/352 |
| 6,016,214 A | * | 1/2000 | Meyer et al. | 359/237 |
| 6,101,023 A | * | 8/2000 | Meyer et al. | 359/330 |
| 6,282,014 B1 | * | 8/2001 | Long | 359/330 |

OTHER PUBLICATIONS

R.F. Harrington, *Time–Harmonic Electromagnetic Fields*, McGraw Hill, Inc., 1961, pp. 169–170.

Mikio Tsuji, Hiroshi Shigesawa and Arthur A. Oliner, *New Interesting Leakage Behaviour on Coplanar Waveguides of Finite and Infinite Widths*, IEEE Transactions on Microwave Theory and Techniques, vol. 39, No. 12, Dec. 1991, pp. 2130–2137.

U. Bhattacharya, S.T. Allen, and M. J. W. Rodwell, *DC–725 GHz Sampling Circuits and Subpicosecond Nonlinear Transmission Lines Using Elevated Coplanar Waveguide*, IEEE Microwave and Guided Wave Letters, vol. 5, No. 2, Feb. 1995, pp. 50–52.

R. Landauer, *Shock Waves in Nonlinear Transmission Lines and their Effect on Parametric Amplification*, IBM Journal of Research, 1960, pp. 391–401.

* cited by examiner

*Primary Examiner*—Jean Jeanglaude
*Assistant Examiner*—Lam T. Mai
(74) *Attorney, Agent, or Firm*—Fliesler Meyer LLP

(57) ABSTRACT

A monolithic non-linear transmission line and sampling circuit with reduced shock-wave-to-surface-wave coupling are presented herein. In coplanar-waveguide (CPW) technology, this reduced coupling is achieved by selecting properly the thickness of the semiconductor substrate, and by elevating the center conductor of the CPW above the substrate surface. The elevated center conductor is supported by means of conducting posts, and may be backed by a low-loss dielectric such as polyimide or silicon nitride. In coplanar-strip (CPS) technology, the reduction in coupling between shock waves and surface waves is achieved by controlling the substrate thickness as in the CPW case, and by elevating the coplanar strips above the substrate surface. The elevated strips are supported by a low-loss dielectric. The reduced coupling in both guiding media enhances the high-frequency performance of nonlinear-transmission-line-based circuits. The semiconductor devices loading the CPW or CPS transmission lines may be Schottky diodes or some other type of variable-reactance device.

15 Claims, 6 Drawing Sheets

MONOLITHIC NONLINEAR TRANSMISSION LINES AND SAMPLING CIRCUITS WITH REDUCED SHOCK-WAVE-TO-SURFACE-WAVE COUPLING

FIELD OF THE INVENTION

The current invention relates generally to the propagation of shock waves on non-linear transmission lines, and more particularly to monolithic nonlinear coplanar waveguides and strips with reduced coupling to surface waves.

BACKGROUND OF THE INVENTION

Monolithic non-linear transmission lines are used as shock-wave generators in numerous high-speed circuits, such as samplers of high-frequency signals. Early developments of shock wave propagation in non-linear transmission lines dealt with the effect of shock waves on parametric amplification. A representative of such developments is "Shock Waves in Non-Linear Transmission Lines and Their Effect on Parametric Amplification", by R. Landauer, IBM Journal of Research, 1960. Since then, numerous applications of monolithic nonlinear transmission lines and derivatives of such have been developed. Generally, these applications related to the generation of pico-second pulses for the purpose of gating samplers of millimeter-wave and submillimeter-wave signals.

One such application involves a monolithic sampler as disclosed in U.S. Pat. No. 4,956,568 ('568 patent). In the '568 patent, a monolithic sampler is disclosed having a local oscillator or pulse generator, shock-wave generator, delay stage, and sampling stage. The shock-wave generator was implemented as a non-linear transmission line loaded with a plurality of varactors. The sampling stage was implemented as a pair of Schottky diodes and holding capacitors, an IF coupling network, and a terminating "resistive" short. In operation, the shock-wave generator compresses the fall time of the pulse generated by the pulse generator, and creates a shock wave that eventually turns on the sampling diodes. While the sampling diodes are turned on, the RF signal to be sampled charges up the holding capacitors and allows a current to flow through the IF network. The "resistive" short operates to bounce back the shock wave signals, turning off the sampling diodes.

In U.S. Pat. No. 5,014,018 ('018 patent), a non-linear transmission line for generation of picosecond electrical transients is disclosed. The '018 patent discusses a co-planar waveguide (CPW) nonlinear transmission line for compressing the fall time of an input signal to an output signal having a fall time of 6–12 picoseconds. The CPW nonlinear transmission line includes a center conductor and two ground-plane conductors implemented on a substrate. The three conductors and substrate are connected to a plurality of varactor diodes, all of which work to reduce the attenuation along the transmission line. In one related patent, U.S. Pat. No. 5,256,996 ('996 patent), a co-planar strip nonlinear transmission line is disclosed wherein a coplanar strip having a first and second conductor is formed on a semiconductor substrate. A plurality of Schottky diodes are connected between the first and second conductors and are isolated from each other. In other related patents such as U.S. Pat. No. 5,267,020 ('020 patent) and U.S. Pat. No. 5,378,939 ('939 patent), a sampler circuit and integrated sampler are disclosed that utilize the co-planar non-linear transmission line and a sampling stage implemented as a pair of sampling diodes and capacitors, an IF coupling network, and a terminating resistive load. Neither the '018, '996, '020, and '939 patent disclosures, nor related publications have addressed the impact of shock-wave-to-surface-wave coupling on the proper high-frequency operation of nonlinear transmission lines and related circuits.

Although nonlinear transmission lines having a top-contacted air-bridged center conductor have been developed, their ability to reduce shock-wave-to-surface-wave coupling has not been recognized. One such nonlinear transmission line is discussed in "DC-725 GHz Sampling Circuits and Subpicosecond Nonlinear Transmission Lines Using Elevated Coplanar Waveguide", by Bhattacharya et al., IEEE MGWL, Vol. 5, No. 2, February 1995. When acting as an electrical step-function generator and periodically loaded with varactor diodes, the per-diode propagation delay is a function of the diode capacitance that is dependant on the reverse bias voltage. A shock wave is formed having a transition time limited by the diode cutoff frequency $f_c$ and the Bragg frequency $f_{Br}$. In operation, these nonlinear transmission lines reduce high skin-effect losses at extremely short wavelengths, and result in shock waves having short fall times. The reduced shock-wave-to-surface-wave coupling resulting from the elevation of the center conductor above the substrate surface has not been recognized, nor has the effect of substrate thickness on this coupling mechanism. Such coupling is highly undesirable as it can deprive a shock wave of its high-frequency harmonics, thus imposing a lower limit on the shock-wave falltime and amplitude. In nonlinear-transmission-line-based samplers, such coupling increases unwanted leakage between the RF and strobe ports, and results in reduced sampler bandwidth and dynamic range.

The developments in the field of nonlinear wave propagation discussed above have aspects that have not been recognized previously. These aspects, when left unchecked would limit the operation of nonlinear-transmission-line-based circuits. Therefore, what is needed are CPW-based nonlinear transmission lines and circuits with reduced coupling between shock waves and surface waves.

SUMMARY OF THE INVENTION

A monolithic non-linear transmission line and sampling circuit with reduced shock-wave-to-surface-wave coupling are presented herein. In coplanar-waveguide (CPW) technology, this reduced coupling is achieved by selecting properly the thickness of the semiconductor substrate, and by elevating the center conductor of the CPW above the substrate surface. The elevated center conductor is supported by means of conducting posts, and may be backed by a low-loss dielectric such as polyimide or silicon nitride. In coplanar-strip (CPS) technology, the reduction in coupling between shock waves and surface waves is achieved by controlling the substrate thickness as in the CPW case, and by elevating the coplanar strips above the substrate surface. The elevated strips are supported by a low-loss dielectric. The reduced coupling in both guiding media enhances the high-frequency performance of nonlinear-transmission-line-based circuits. The semiconductor devices loading the CPW or CPS transmission lines may be Schottky diodes or some other type of variable-reactance device.

DETAILED DESCRIPTION

A monolithic non-linear transmission line and sampling circuit with reduced shock-wave-to-surface-wave coupling are presented herein. In coplanar-waveguide (CPW) technology, this reduced coupling is achieved by selecting properly the thickness of the semiconductor substrate, and by elevating the center conductor of the CPW above the substrate surface. The elevated center conductor is supported by means of conducting posts, and may be backed by a low-loss dielectric such as polyimide or silicon nitride. In coplanar-strip (CPS) technology, the reduction in coupling between shock waves and surface waves is achieved by controlling the substrate thickness as in the CPW case, and by elevating the coplanar strips above the substrate surface. The elevated strips are supported by a low-loss dielectric. The reduced coupling in both guiding media enhances the high-frequency performance of nonlinear-transmission-line-based circuits. The semiconductor devices loading the CPW or CPS transmission lines may be Schottky diodes or some other type of variable-reactance devices.

Figure 1:
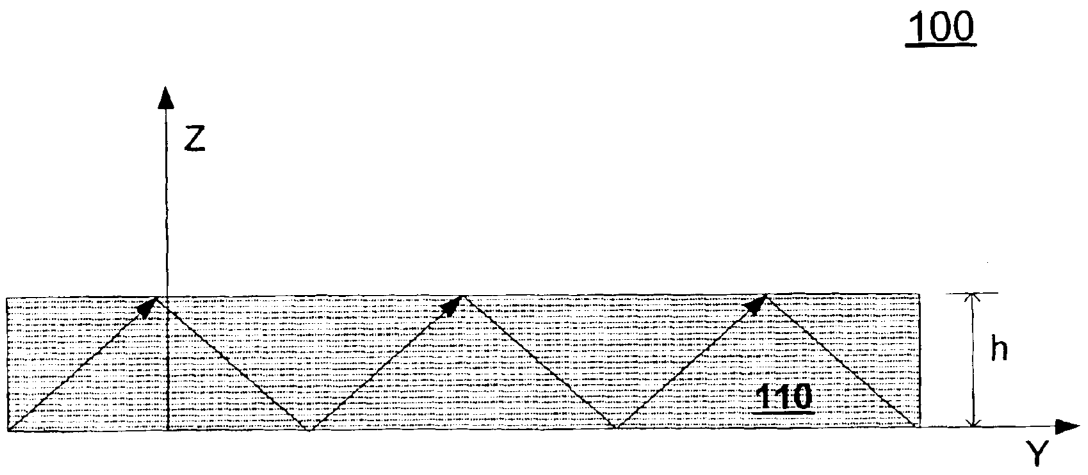
FIG. 1 is an illustration of a substrate acting as an electromagnetic waveguide that supports surface-wave modes in accordance with one embodiment of the present invention.

A substrate 110 in accordance with the present invention is illustrated by the system 100 of FIG. 1. The substrate may be a GaAs substrate or some other type of semiconductor substrate suitable for use in monolithic nonlinear transmission lines. For purposes of illustration only, the substrate will be referred to as a GaAs substrate, though the present invention is intended to work with other types of substrates as well, all considered within the scope of the present invention. The substrate has a thickness h in the Z direction and is assumed to have an infinite length in the X and Y directions.

The thickness of the GaAs substrate plays a critical role in controlling the degree of both shock-wave-to-surface-wave coupling in nonlinear transmission lines and millimeter/submillimeter-wave-to-surface wave coupling in circuits such as samplers. Such coupling is highly undesirable as it represents a power-loss mechanism that can impose a limit on the minimum achievable shock-wave fall time by depriving shock waves of high frequency content, increase cross talk between circuits residing on the same substrate, lead to circuit oscillation and transverse resonances in a substrate, and cause diffracted waves at substrate edges, thereby resulting in undesirable radiation.

The substrate 110 supports $TE_n$-to-Z and $TM_n$-to-Z surface-wave modes. The surface wave modes have cutoff frequencies given by $$f_{cn} = \frac{n}{2h\sqrt{\varepsilon_d\mu_d - \varepsilon_0\mu_0}},\ n = 0, 1, 2, \ldots \qquad (1)$$

where $\epsilon_d=\epsilon_0\epsilon_r$, $\mu_d=\mu_0\mu_r$, $\epsilon_r$ is the relative permittivity of the substrate material, $\mu_r$ is the relative permeability of the substrate material, and $\epsilon_0$ and $\mu_0$ are the permittivity and permeability of free space, respectively. For a GaAs substrate, the relative permittivity $\epsilon_r$ is approximately 13.0 and the relative permeability $\mu_r$ is approximately 1.0.

For a GaAs substrate having a height h of 450 $\mu$m, the cutoff frequencies of the first five surface-wave modes according to equation (1) are $f_{c0}$=0 Hz, $f_{c1}$=96.2 GHz, $f_{c2}$=192.2 GHz, $f_{c3}$=288.5 GHz, $f_{c4}$=384.6 GHz. If the substrate thickness is reduced to 100 $\mu$m, the substrate cutoff frequencies of the higher order modes are increased, such that $f_{c0}$=0 Hz, $f_{c1}$=432.7 GHz, $f_{c2}$=865.4 GHz, $f_{c3}$=1.298 THz, $f_{c4}$=1.731 THz.

Figure 2:
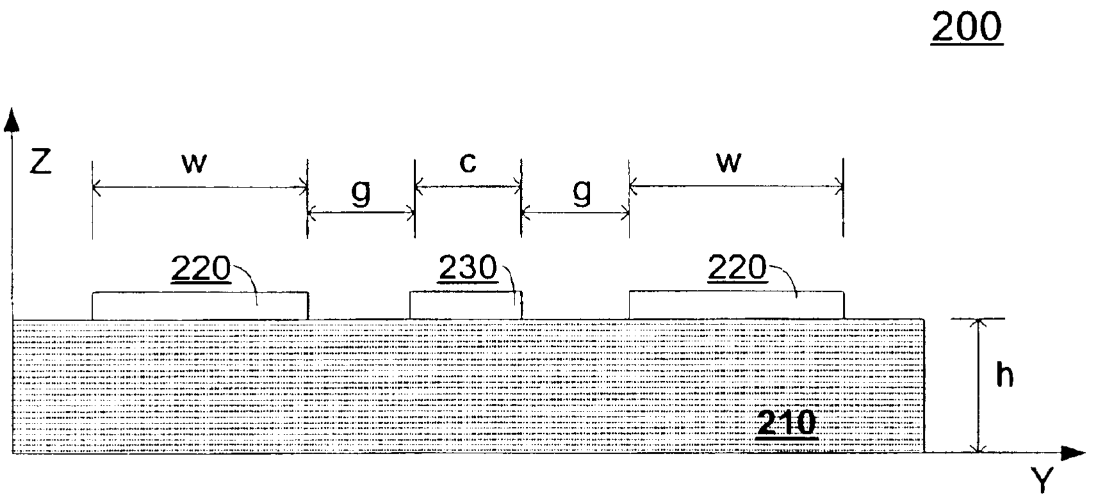
FIG. 2 Prior Art
FIG. 2 is an illustration of the cross-section of a coplanar waveguide (CPW) transmission line on a GaAs substrate that supports surface-wave modes in accordance with the prior art.

A GaAs substrate waveguide 200 having three single layered conducting strips is illustrated in FIG. 2. Substrate 200 includes substrate 210, conducting strips 220, and a center conducting strip 230. In the waveguide shown, the substrate 210 has a height h, side conducting strips 220 have a width w, and center conductor 230 has a width c. The outside conducting strips 220 and center conductor 230 have a thickness of t and are separated by a gap of length g. When the substrate is loaded with three conducting strips as shown in FIG. 2, a coplanar waveguide (CPW) is formed that exhibits power leakage that couples to the surface-wave modes of the substrate when the CPW is driven in its fundamental mode beyond some frequency $f_{cpw}$. The CPW leakage may also couple to other CPW lines and circuits located near the driven CPW. The frequency $f_{cpw}$ is a function of h, w, g, c, and t, as discussed in "New Interesting Leakage Behavior on Coplanar Waveguides of Finite and Infinite Widths", Tsuji et. al, IEEE Trans. MTT, vol. 39, No. 12, December 1991.

The dimensions of the CPW and CPS lines are based on the highest operating frequency (or equivalently shortest desired shock falltime) and are calculated using numerical electromagnetic analysis. This analysis takes into account all coupling and wave propagation phenomena in the semiconducting substrate.

With respect to the waveguide shown in FIG. 2, a maximum GaAs substrate thickness $h_{max}$ can be found for a given w, g, c and t, such that the highest operating frequency $f_u$ of the CPW circuit obeys $f_u<f_{cpw}<f_{c1}$. This limit on the highest operating frequency $f_u$ ensures that shock-wave-to-surface-wave coupling in CPW-based nonlinear transmission lines is reduced, coupling through the substrate between CPW circuits residing on the same substrate is weak, transverse resonances are somewhat suppressed, and diffracted waves and their corresponding radiation are minimized.

Figure 3:
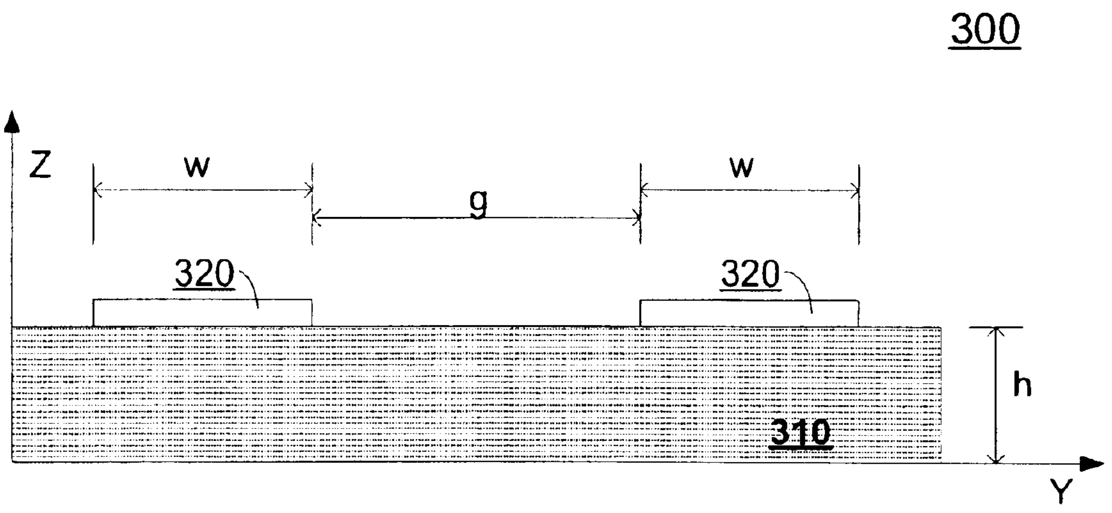
FIG. 3 Prior Art
FIG. 3 is an illustration of the cross section of a co-planar strip transmission line on a GaAs substrate that supports surface-wave modes in accordance with the prior art.

Similar properties are exhibited by non-linear transmission lines having a pair of co-planar strips. An example of one such CPS is illustrated in FIG. 3. Monolithic nonlinear CPS 300 includes a semiconducting substrate 310 and conductors 320. The substrate can be configured to have a thickness of h as discussed in reference to the substrate of CPW 200. The conductor width w and conductor separation g may both be configured to achieve a desirable phase constant β and leakage constant α.

Figure 4:
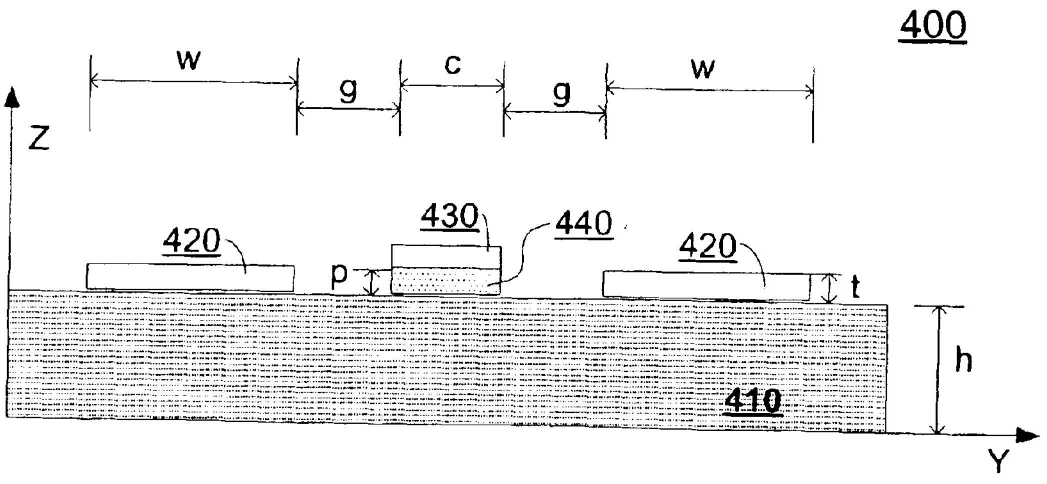
FIG. 4 is an illustration of an elevated-center-conductor co-planar waveguide transmission line in accordance with one embodiment of the present invention.

To further reduce undesirable coupling, a CPW can be configured to have at least one elevated conductor. A CPW 400 in accordance with one embodiment of the present invention is illustrated in FIG. 4. CPW 400 includes a semiconducting substrate 410, side conducting strips (also known as grounding strips) 420, center conducting strip 430, and elevation element 440. As shown in FIG. 4, substrate 410 has a height h, side conducting strips 420 have a width w, and center conducting strip 430 and elevation element 440 have a width c. The side and center conducting strips have a thickness t and are separated by a gap g. The elevation element has a thickness p. Values used for h, w, g, c, and t are derived from nonlinear-transmission-line design requirements and electromagnetic analysis.

The conducting strips are raised in order to reduce the coupling to surface wave modes in the semiconducting substrate. In determining what level of elevation to raise the strips, several factors are taken under consideration. One such factor is the highest frequency of operation of the circuit, or equivalently, the desired falltime of the shock wave. Accordingly, in one embodiment of the present invention, in the case of a coplanar waveguide, only the center conductor is elevated. In one embodiment, a range of thickness for the elevation layer p is 0.5 micrometers to 3 micrometers.

Figure 5:
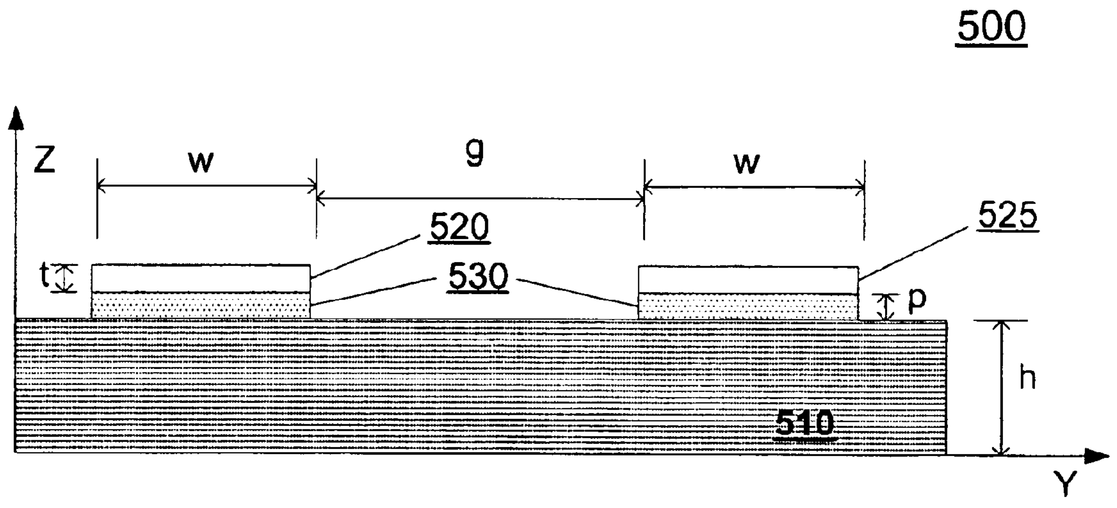
FIG. 5 is an illustration of an elevated co-planar strip transmission line in accordance with one embodiment of the present invention.

A CPS 500 including elevated coplanar conducting strips is illustrated in FIG. 5. CPS 500 includes semiconducting substrate 510 having a thickness h, a first conducting strip 520 having a thickness t, a second conducting strip 525 having a thickness t, and elevation elements 530 having a thickness p. The conductors have a width w and are separated by a gap length g. In one embodiment, the elevation elements are comprised of polyimide. In another they are formed out of silicon nitride. Values for the substrate thickness h, conductor gap g and conductor thickness t are derived from nonlinear-transmission-line design requirements and electromagnetic analysis.

The first conducting strip 520 and the second conducting strip 525 are raised using elevation elements 530 in order to reduce the coupling to surface wave modes in the dielectric. In determining what level of elevation to raise the strips, factors are taken under consideration similar to those in determining the elevation of the CPW of FIG. 4. To maintain symmetry in the strips forming the guiding medium, both conductors are raised. In one embodiment, a range of thickness for the elevation layer p is 0.5 micrometers to 3 micrometers.

Figure 6:
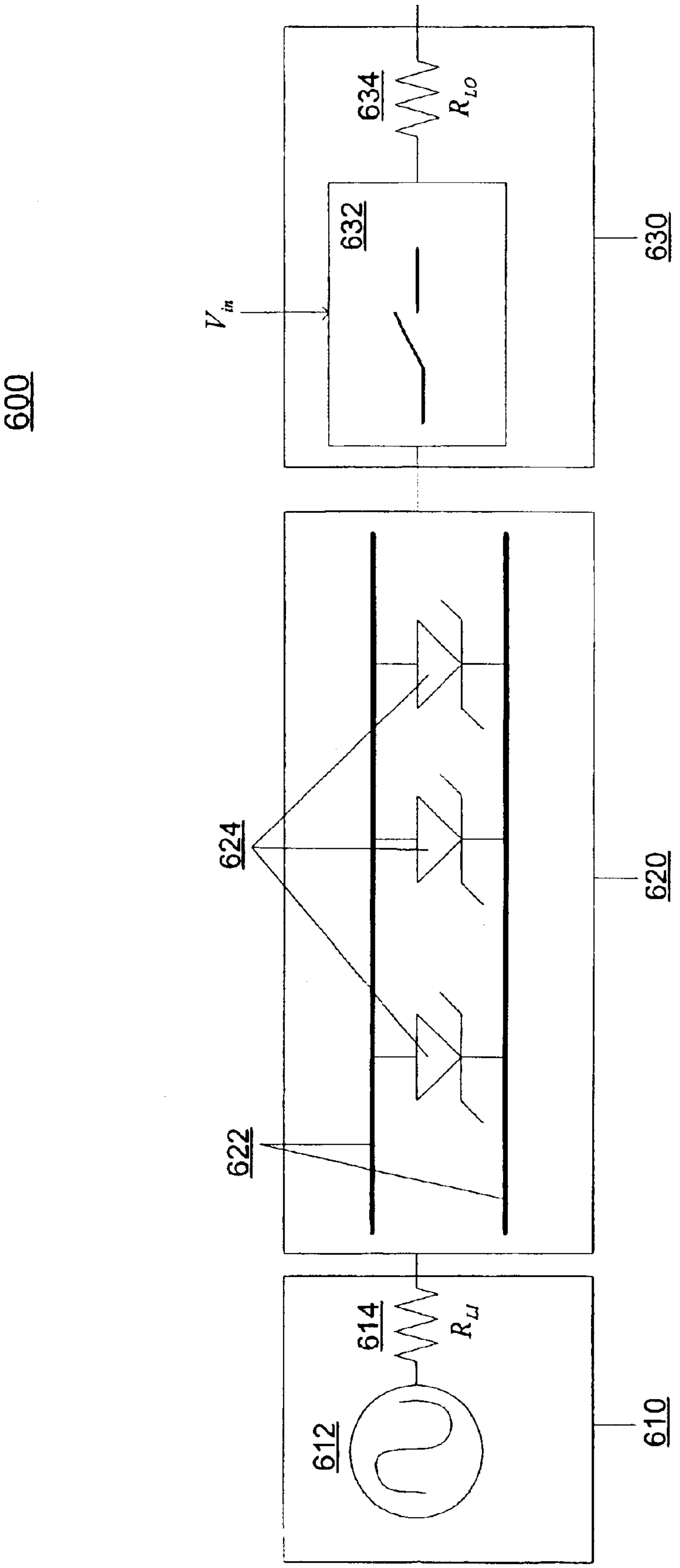
FIG. 6 is an illustration of a monolithic nonlinear coplanar-waveguide-based sampler system in accordance with one embodiment of the present invention.

A monolithic nonlinear elevated-center-conductor CPW of the present invention may be integrated with an elevated-center-conductor CPW-based sampler circuit. A schematic of a sampler 600 integrated with a monolithic nonlinear coplanar waveguide of the present invention is illustrated in FIG. 6. Sampler 600 includes a non-linear transmission line 620, signal-generator stage 610, and sampling stage 630. Signal-generator stage 610 is simplified to show a signal generator 612 and a generator resistance 614. The input of transmission line 620 is coupled to the output of stage 610 and includes conductors 622 and transmission load elements 624. In one embodiment, the transmission load elements are varactors. Sampling stage 630 is coupled to transmission line 620 and includes sampler circuitry 632 and output load resistance 634. Other elements of monolithic samplers that may be included in the sampler of the present invention but are not shown include delay stages and pulse generators. In operation, signal-generator stage 610 provides an input signal to stage 620. The signal is received by and propagates along loaded non-linear transmission line 620. As the signal propagates along the loaded transmission line, a shock wave is generated comprising a rapid sequence of edge sharpened pulses. The pulses may then be optionally delayed or processed by delay stages and reflection blocks (not shown). The generated shockwave is then used to gate the sampler and sample an input signal. Input signal sampling is done at intervals associated with the repetition rate of the pulses that comprise the generated shockwave. As the nonlinear transmission line of the present invention reduces shock-wave-to-surface-wave coupling effects, it contributes to more efficient pulse generation than monolithic sampling circuits known in the art, in addition to reducing coupling to nearby circuits.

In one embodiment, fabrication of the monolithic sampler of the present invention may be performed using conventional semiconductor fabrication techniques. Generally, a substrate of gallium arsenide or some other appropriate semiconducting material receives a deposition of a layer of n+ material followed by a layer of n− material. Ohmic contacts are formed and are followed by combined mesa etching and ion implantation in order to achieve isolation. Schottky contacts are then evaporated and a thick silicon nitride layer is deposited on the wafer surface. Silicon nitride is then etched away everywhere except at the location of the CPW center conductor. The etching also results in apertures that allow the Schottky contacts to connect to the center conductor via bridge posts. The CPW ground conductors are evaporated, and are followed by a gold-plating process in order to form the elevated center conductor. Additional process steps involve the deposition of silicon nitride (dielectric for capacitors and surface passivation), and gold plating (formation of CPW air bridges). A similar process is followed in the case of a CPS-based nonlinear transmission line in which both conductors reside on a thick silicon nitride layer. In both CPW and CPS cases, polyimide can be used in place of silicon nitride as an elevating layer for conductors. As a result, a faster and more efficient monolithic transmission line or sampler may be generated with reduced coupling characteristics as discussed above.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A monolithic non-linear transmission line comprising:

a semiconductor substrate;

a first grounding strip, said first grounding strip coupled to said semiconductor substrate;

a second grounding strip, said second grounding strip coupled to said semiconductor substrate;

an elevation element, said elevation element coupled to said semiconductor substrate; and a center conducting strip, said center conducting strip displaced between said first grounding strip and said second grounding strip and coupled to said elevation element.

2. The monolithic non-linear transmission line of claim 1 wherein said elevation element has a thickness between 0.5 and 3 micrometers.

3. The monolithic non-linear transmission line of claim 2 wherein said first grounding strip, said second grounding strip and said center conducting strip have substantially the same thickness.

4. The monolithic non-linear transmission line of claim 1 wherein said elevation element is comprised of polyimide.

5. The monolithic non-linear transmission line of claim 1 wherein said elevation element is comprised of silicon nitride.

6. A monolithic non-linear transmission line comprising:

a semiconductor substrate;

a first elevation element, said first elevation element coupled to said semiconductor substrate;

a first conductor strip, said first conductor strip coupled to said first elevation element;

a second elevation element, said second elevation element coupled to said semiconductor substrate; and a second conductor strip, said second conductor strip coupled to said first elevation element.

7. The monolithic non-linear transmission line of claim 6 wherein said first and second elevation elements have a thickness between 0.5 and 3 micrometers.

8. The monolithic non-linear transmission line of claim 7 wherein said first conductor strip and said second conducting strip have substantially the same thickness.

9. The monolithic non-linear transmission line of claim 6 wherein said first and second elevation elements are comprised of polyimide.

10. The monolithic non-linear transmission line of claim 6 wherein said first and second elevation elements are comprised of silicon nitride.

11. A monolithic sampler comprising:

a transmission line, the transmission line configured to receive an oscillating signal and generate a shock wave, the transmission line including:

a semiconductor substrate;

a first grounding strip, the first grounding strip coupled to the semiconductor substrate;

a second grounding strip, the second grounding strip coupled to the semiconductor substrate;

an elevation element, the elevation element coupled to the semiconductor substrate; and a center conducting strip, the center conducting strip displaced between the first grounding strip and the second grounding strip and coupled to the elevation element.

12. The monolithic sampler of claim 11 further comprising:

a sampling circuit, said sampling circuit coupled to said transmission line and configured to receive the shock wave and receive an input signal, the sampling circuit configured to sample the input signal while gated by the shock wave.

13. The monolithic sampler of claim 11 further comprising:

a driving circuit, said driving circuit configured to provide an oscillating signal to the transmission line, the oscillating signal configured to drive the transmission line in fundamental mode of the transmission line.

14. The monolithic sampler of claim 11 wherein the elevation element has a thickness between 0.5 and 3 micrometers.

15. The monolithic sampler of claim 11 wherein the first grounding strip, the second grounding strip and the center conducting strip have substantially the same thickness.

* * * * *